(12) United States Patent  
Aharoni

(10) Patent No.: US 8,799,375 B1
(45) Date of Patent: Aug. 5, 2014

(54) UNALTERABLE NOTIFICATION SERVICE

(75) Inventor: Idan Aharoni, Tel Aviv (IL)

(73) Assignee: EMC Corporation, Hopkinton, MA (US)

( * ) Notice: Subject to any disclaimer, the term of this patent is extended or adjusted under 35 U.S.C. 154(b) by 282 days.

(21) Appl. No.: 12/894,515

(22) Filed: Sep. 30, 2010

(51) Int. Cl.
*G06F 15/16* (2006.01)

(52) U.S. Cl.
USPC .......................................... 709/206; 709/219

(58) Field of Classification Search
None
See application file for complete search history.

(56) References Cited

U.S. PATENT DOCUMENTS

| | | | |
|---|---|---|---|
| 7,761,381 B1 | 7/2010 | Fitch et al. | |
| 7,860,934 B1 * | 12/2010 | Wolfe et al. | 709/206 |
| 8,060,415 B2 * | 11/2011 | Ezzo | 705/26.1 |
| 2004/0010510 A1 * | 1/2004 | Hotti | 707/103 R |
| 2004/0230448 A1 * | 11/2004 | Schaich | 705/1 |
| 2006/0173985 A1 * | 8/2006 | Moore | 709/223 |
| 2009/0106131 A1 * | 4/2009 | Danesh-Bahreini et al. | 705/30 |
| 2009/0230448 A1 * | 9/2009 | Nishimura et al. | 257/296 |
| 2009/0299878 A1 | 12/2009 | Keresman, III et al. | |
| 2010/0131455 A1 * | 5/2010 | Logan et al. | 707/602 |
| 2010/0205271 A1 * | 8/2010 | Callaghan | 709/206 |

\* cited by examiner

*Primary Examiner* — John B. Walsh
(74) *Attorney, Agent, or Firm* — BainwoodHuang

(57) ABSTRACT

A technique is presented of providing, in an electronic central server, transactional information to a user. The technique includes receiving a set of transaction messages from a set of transactional information sources, each transaction message including respective transaction data. The technique also includes generating a transaction history from the set of transaction messages, the transaction history including the respective transaction data of each transaction message. The technique further includes delivering an aggregate message to a set of user devices, the aggregate message including the transaction history and being presented in atomic form to the user in order to prevent an attacker from excising particular transaction data from the aggregate message.

18 Claims, 5 Drawing Sheets

UNALTERABLE NOTIFICATION SERVICE

BACKGROUND

An example of an electronic transaction is an online purchase of a product or service which charges a user's credit card or bank account. Another example of an electronic transaction is a wire transfer which sends funds from one bank account to another bank account.

To effectuate an electronic transaction, a user typically logs onto a computer and runs a program (e.g., a web browser, an institution-specific graphical user interface, etc.) which communicates with a remote institution that carries out the electronic transaction (e.g., an online store, a financial institution website, etc.). At some point during the process, the remote institution may send a notification email message to the user's computer informing the user that the institution has handled that particular electronic transaction.

To effectuate another electronic transaction, the user communicates with another remote institution (or perhaps the same institution) via the user's computer in the same manner. Again, at some point during the process, the user may receive a separate (i.e., second) notification email message informing the user that the institution has handled the second electronic transaction.

SUMMARY

Unfortunately, there are deficiencies to the above-described conventional approach to effectuating electronic transactions and receiving separate notification email messages. For example, it may be possible for a hacker (i.e., a phisher) to obtain sensitive user information such as a username, a password, a user's credit card number, a user's bank account number, etc. and carry out an unauthorized electronic transaction at a remote institution. Furthermore, before the user is able to read the notification email message which informs the user of the electronic transaction, the hacker may be able to logon to the user's email account and delete that notification email message. As a result, the user will not know of the electronic transaction until a significant amount of time has passed, if at all.

In contrast to the above-described conventional approach to effectuating electronic transactions and receiving separate notification email messages, an improved technique provides transactional information to a user [customer] via delivery of an aggregate message to a set of user devices to which the user has access (i.e., one or more user devices). The aggregate message includes a transaction history and is presented in atomic form to the user in order to prevent a hacker (e.g., a phisher or other type of fraudster) from excising particular transaction data from the aggregate message.

Such a technique of providing, in an electronic central server, transactional information to a user includes receiving a set of transaction messages from a set of transactional information sources, each transaction message including respective transaction data. The technique also includes generating a transaction history from the set of transaction messages, the transaction history including the respective transaction data of each transaction message. The technique further includes delivering an aggregate message to a set of user devices, the aggregate message including the transaction history and being presented in atomic form to the user in order to prevent an attacker from excising particular transaction data from the aggregate message.

Implementations are directed to the following.

Generating the transaction history from the set of transaction messages can include extracting first transaction data from a first transaction message, extracting second transaction data from a second transaction message, and combining the first transaction data and the second transaction data to form at least a portion of the transaction history.

Delivering the aggregate message to the set of user devices can include sending a webpage to a browser running on a computerized device, the webpage including a list of financial transactions as the transaction history which includes the respective transaction data of each transaction message. Delivering the aggregate message to the set of user devices can further include broadcasting a wireless signal to a wireless phone device, the wireless signal including the list of financial transactions as the transaction history which includes the respective transaction data of each transaction message.

Delivering the aggregate message to the set of user devices can further include formatting the aggregate message into an XML document to be read by a syndicate feed reader on a user device from the set of user devices. Alternatively, the document can be formatted into a proprietary format that is pulled and read by an application programming interface, the details of which will be described below. Delivering the aggregate message to the set of user devices can further include formatting the aggregate message to be inserted into an email message to be read by an email program on a user device from the set of user devices and inserting a digital certificate into the email message, the digital certificate causing delivery settings associated with the email message to the email program to take precedence over user-defined settings within the email program for a predetermined period of time and prevent the user from deleting the email message for a predetermined period of time.

Receiving the set of transaction messages from the set of transactional information sources can include acquiring the set of transaction messages through a set of secure communications channels. In this case, delivering the aggregate message to the set of user devices can include transmitting the aggregate message to the set of user devices through communications media which is less secure than the set of secure communications channels.

The technique can further include counting a number of individual transactions to be reported to the user within the transaction history and billing the user or the transaction source a fee based on the number of individual transactions sent via the aggregate message to the set of user devices.

The technique can further include storing the transaction history in a location within a computer readable storage medium accessible to the electronic central server, the location associated with the user and receiving a request from the user for the transaction history.

The technique can further include sending an acknowledgment message to each transactional information source in the set of transactional information sources upon receipt of the set of transaction messages and receiving an acknowledgment message from the user that the aggregate message was delivered to the set of user devices.

Receiving the set of transactional messages includes acquiring the set of transactional messages in response to calls to an application programming interface, the application programming interface constructed and arranged to receive information concerning a transaction involving the user, construct a message containing the information concerning the transaction and send the message to the electronic central server.

Alternatively, delivering the aggregate message to the set of user devices can include communicating, through an application programming interface [API] stored and executed on at least one user device from the set of user devices, an aggregate message to the user. In this case, the API can be configured to allow the user to log in and retrieve the aggregate message from the electronic central server. The API can take the form of a toolbar embedded in a browser such as Google Toolbar, MSN Messenger, etc.

A further embodiment to the stated problem is an apparatus configured to provide transactional information to a user. The apparatus includes a network interface, a non-volatile memory, and a processor coupled to the network interface and the non-volatile memory. The processor is configured and arranged to perform the technique described above.

Implementations are directed to the following.

The network interface can be coupled a set of secure communications channels. In this case, the network interface can be coupled to a communications media which is less secure than the set of secure communications channels.

The communications media can include a broadcast device configured to broadcast a wireless signal to a wireless phone device, the wireless signal including the list of financial transactions as the transaction history which includes the respective transaction data of each transaction message.

The non-volatile memory can be constructed and arranged to store the transaction history in a location associated with the user. In this case, the network interface can be further configured to receive requests from the user for the transaction history.

The processor can be further configured to format the aggregate message to be inserted into an email message to be read by an email program on a user device from the set of user devices and insert a digital certificate into the email message, the digital certificate causing delivery settings associated with the email message to the email program to take precedence over user-defined settings within the email program.

A further embodiment to the stated problem is a computer program product, which includes a non-transitory computer readable storage medium storing code, when executed by a computer, causes the computer, upon receiving a set of transaction messages over a network interface from a set of transactional information sources, each transaction message including respective transaction data, the computer readable storage medium accessible to an electronic central server. The code includes instructions to generate a transaction history from the set of transaction messages, the transaction history including the respective transaction data of each transaction message. The code also includes instructions to deliver, over the network interface, an aggregate message to a set of user devices, the aggregate message including the transaction history and being presented in atomic form in order to the user in order to prevent an attacker from excising particular transaction data from the aggregate message.

Implementations are directed to the following.

Receiving the set of transaction messages from the set of transactional information sources can include acquiring the set of transaction messages through a set of secure communications channels. In this case, delivering the aggregate message to the set of user devices can include transmitting the aggregate message to the set of user devices through communications media which is less secure than the set of secure communications channels.

Delivering the aggregate message to the set of user devices can further include formatting the aggregate message into an XML document to be read by a syndicate feed reader on a user device from the set of user devices.

Delivering the aggregate message to the set of user devices can further include formatting the aggregate message to be inserted into an email message to be read by an email program on a user device from the set of user devices and inserting a digital certificate into the email message, the digital certificate causing delivery settings associated with the email message to the email program to take precedence over user-defined settings within the email program.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique of providing transactional information to a user [customer] includes delivering an aggregate message to a set of user devices to which the user has access. The aggregate message includes a transaction history and is presented in atomic form to the user in order to prevent a fraudster (or other type of malicious attacker) from excising particular transaction data from the aggregate message.

Figure 1:
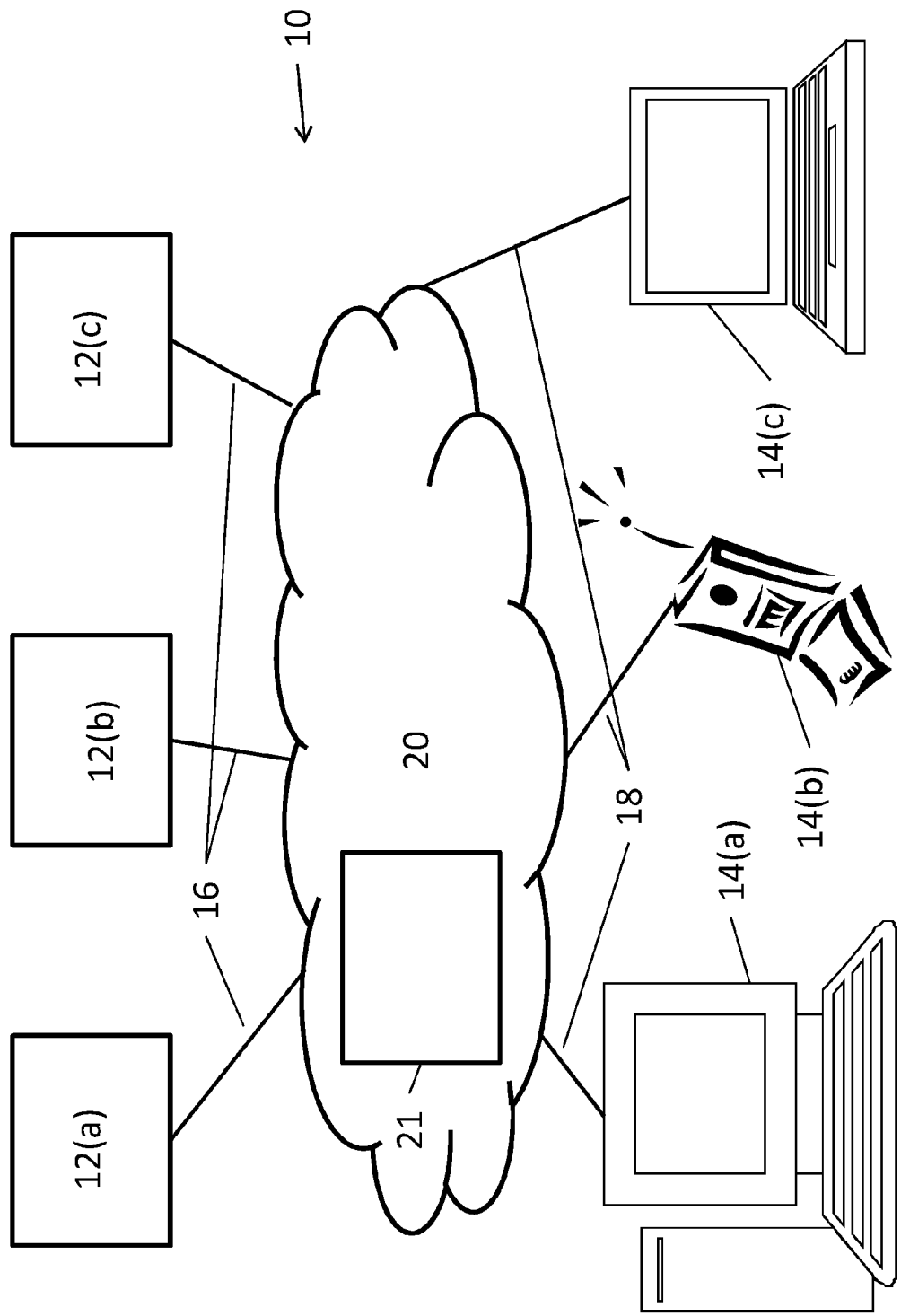
FIG. 1 is a block diagram illustrating an electronic environment under which notifications between institutions and users flow.

FIG. 1 shows an electronic environment 10 under which notifications 16-18 between institutions and users flow. Servers from institutions 12(*a-c*) record electronic transactions (e.g., online retail transactions, banking transactions, etc.) from a user and deliver notifications 16-18 to user devices such as a computer 14(*a*), wireless phone device 14(*b*), or laptop 14(*c*). The notifications are delivered via network infrastructure 20 which includes an electronic central server 21.

Network infrastructure 20 includes a set of institution-side channels 16 between the institutions 12(*a-c*) and the electronic central server 21. Additionally, the network infrastructure 20 includes a set of user-side channels 18 between the electronic central server 21 and the user devices 14(*a-c*). It should be understood that parts of the network infrastructure 20 may include a public network such as the Internet, public airwaves, and so on.

The set of institution-side channels 16 (i.e., the communications pathways between the institutions 12(*a-c*) and the electronic central server 21) is preferably highly secure and resistant to hackers. Alternatively, institution-side channels 16 can use public networks along with a specific "handshake" to prevent a fraudster from masquerading as an institution. Along these lines, the institutions 12(*a-c*) and the electronic central server 21 have the resources to devote towards imposing a high level of security.

On the other hand, the set of user-side channels 18 between the electronic central server 21 and the user devices 14(*a-c*)

may be less secure and more vulnerable to a malicious hacker. The fraudster, however, is not able to control the flow of information to the user. For example, if the fraudster opts out of a notification service, the user will receive a message stating that the notification service was stopped. To this effect, during operation of the electronic environment 10, the electronic central server 21 periodically sends an aggregate message to the user devices 14(*a-c*). The aggregate message includes a transaction history and is presented in atomic form to the user in order to prevent a fraudster (or other type of malicious attacker) from excising particular transaction data from the aggregate message. Accordingly, as long as the user is able to receive the aggregate message, the user is able to monitor all of the user's electronic transaction activity. Moreover, the absence of the aggregate message (i.e., the failure to receive the aggregate message from the electronic central server 21) provides a clear signal to the user that the user should further investigate as a safeguard against an attacker.

Figure 2:
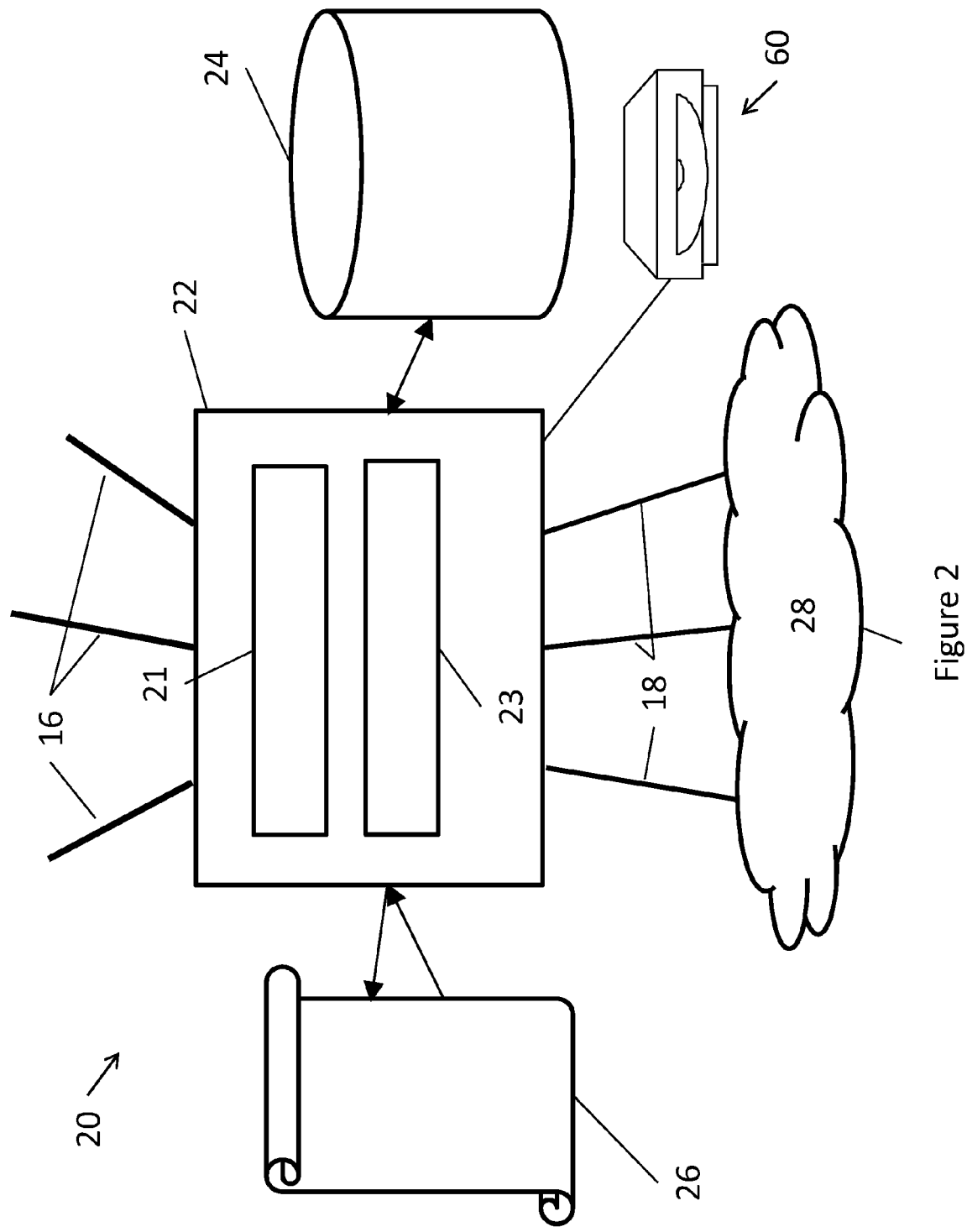
FIG. 2 is a block diagram of an electronic central server.

FIG. 2 illustrates a more detailed view of a network infrastructure 20 which includes electronic central server 21. Electronic central server 21 has a network interface 22, a processor 23, and a non-volatile memory 24.

Network interface 22, as noted above, includes connections to secure channels 25 to institutions 12. On the other hand, network interface 22 also includes connections to an insecure public network 28 over which communications between electronic central server 21 and user devices 14 take place.

Non-volatile memory 24 stores various transaction data received from institutions 12 through network interface 22.

Processor 23 is coupled to network interface 22 and non-volatile memory 24. Processor 23, at some prompt, is configured to locate data on non-volatile memory 24 corresponding to a particular user having user devices 14. Processor 23 is further configured to combine all transaction data relating to the user into an aggregate message 26 containing a transaction history.

Figure 3:
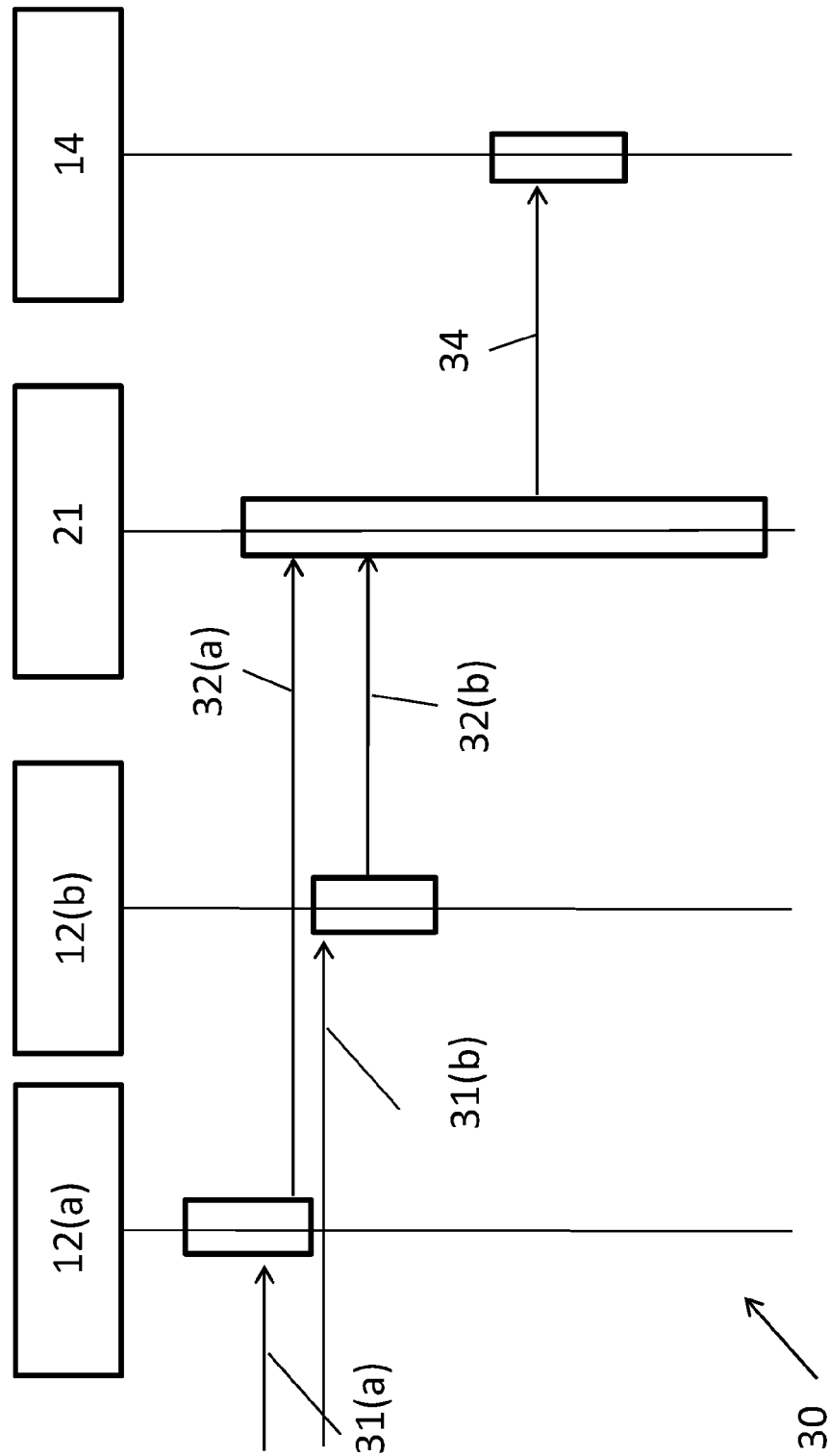
FIG. 3 is a sequence diagram illustrating "push" notifications.

FIG. 3 is a sequence diagram illustrating an operation 30 in which the user is notified of transactions involving the user and occurring within institutions 12. The user is made aware of all transactions involving the user via a listing of transactions between the user and institution 12.

During operation, institutions 12(*a*) and 12(*b*) receive notifications 31(*a*) and 31(*b*), respectively, of transactions involving a user. Electronic central server 21 receives transaction messages 32(*a*) and 32(*b*), respectively, from institutions 12(*a*) and 12(*b*) through network interface 22 over secure channels 16. Transaction messages 32 preferably describe financial transactions; nevertheless, other transactions are possible. When the transaction messages 32 are sent from institutions 12 to electronic central server 21 over secure channels 16, the chances of interception or alteration of any transaction message is greatly reduced from the case where the transaction messages 32 are sent over a public network. To maintain security, institutions 12 will be instructed not to include sensitive information that can be part of a transaction message, e.g., social security number, credit card number, bank account number, etc., are omitted from messages 31.

Preferably, institutions 12 are set up to send the transaction messages to the central electronic server 21 via a dedicated application programming interface [API] 13. The APIs take the form of a set of instructions executed by a processor on a server at one of the institutions 12. The APIs are constructed and arranged to receive information concerning a transaction involving the user, construct a message containing the information concerning the transaction and send the message to electronic central server 21. Because the communications between institutions 12 and electronic central server 21 are more secure than those between user devices 14 and electronic central server 21, the APIs can be constructed and arranged to increase or decrease the security of the communications channels at the institutions as desired. A further advantage of using an API to construct the transaction messages is that information sent to electronic central server can be customized or standardized across different institutions 12 and platforms to whatever degree institutions 12 desire.

Electronic central server 21, upon receiving the transaction messages 32, performs a storage of the transaction messages on non-volatile memory 24. The storage can be organized by institution 12 and a user identifier or just by a user identifier when there is a common user identification scheme used by institutions 12, e.g., social security number.

At a certain prompt, electronic central server 21 collects the stored transaction messages corresponding to a user having user devices 14. The prompt may be a certain time [e.g., a daily message] or a prompt from one or more of institutions 12. In collecting the messages, processor 23 on electronic central server 21 locates the transaction messages on non-volatile memory 24 and places the messages in a temporary location on non-volatile memory 24.

Once the stored transaction messages corresponding to the user are collected and placed in a location, processor 23 combines the transaction messages into an aggregate message 26 containing the transaction history. The transaction history within aggregate message 26 preferably contains the transaction messages collected since a previous sending of an aggregate message to user devices 14. Alternatively, an entire transaction history may be sent to user devices 14.

Aggregate message 26 is constructed and arranged to contain the details of each transaction from the user's transaction history. Further, aggregate message 26 is presented in an atomic form that is very difficult to alter in any way.

Processor 23, once aggregate message 26 is constructed, performs a delivery 34 of aggregate message 26 to user devices 14. The delivery 34 of aggregate message 26 to user devices 14 is done over a public network, e.g., the Internet, which is less secure than the secure channels used to send the transaction messages from institutions 12 to electronic central server 21. The delivery 34 takes the form of sending a webpage to a browser running on user devices 14, the webpage including a list of financial transactions as the transaction history which includes the respective transaction data of each transaction message. Further, the delivery 34 can take the form of broadcasting a wireless signal to wireless phone device 14(*b*), the wireless signal including the list of financial transactions as the transaction history which includes the respective transaction data of each transaction message. User devices 14 can be configured to send an acknowledgment message 35 to electronic central server 21.

Alternatively, the delivery 34 can include formatting the aggregate message into an XML document to be read by a syndicate feed reader on user devices 14. An example of such a syndicate feed reader is Google Reader, made by Google, Inc.

Alternatively, the delivery 34 can include formatting the aggregate message to be inserted into an email message to be read by an email program at least one of user device user devices 14 and inserting a digital certificate into the email message. In this case, the digital certificate causes delivery settings associated with the email message to the email program to take precedence over user-defined settings within the email program for a predetermined period of time. For example, if a fraudster has accessed the user's email account so as to filter out messages having text naming one of the institutions 12, the certificate would override such a filter and be delivered to user devices 14. The certificate may also be able to prevent the fraudster from deleting the E-mail message during a pre-determined length of time.

Figure 4:
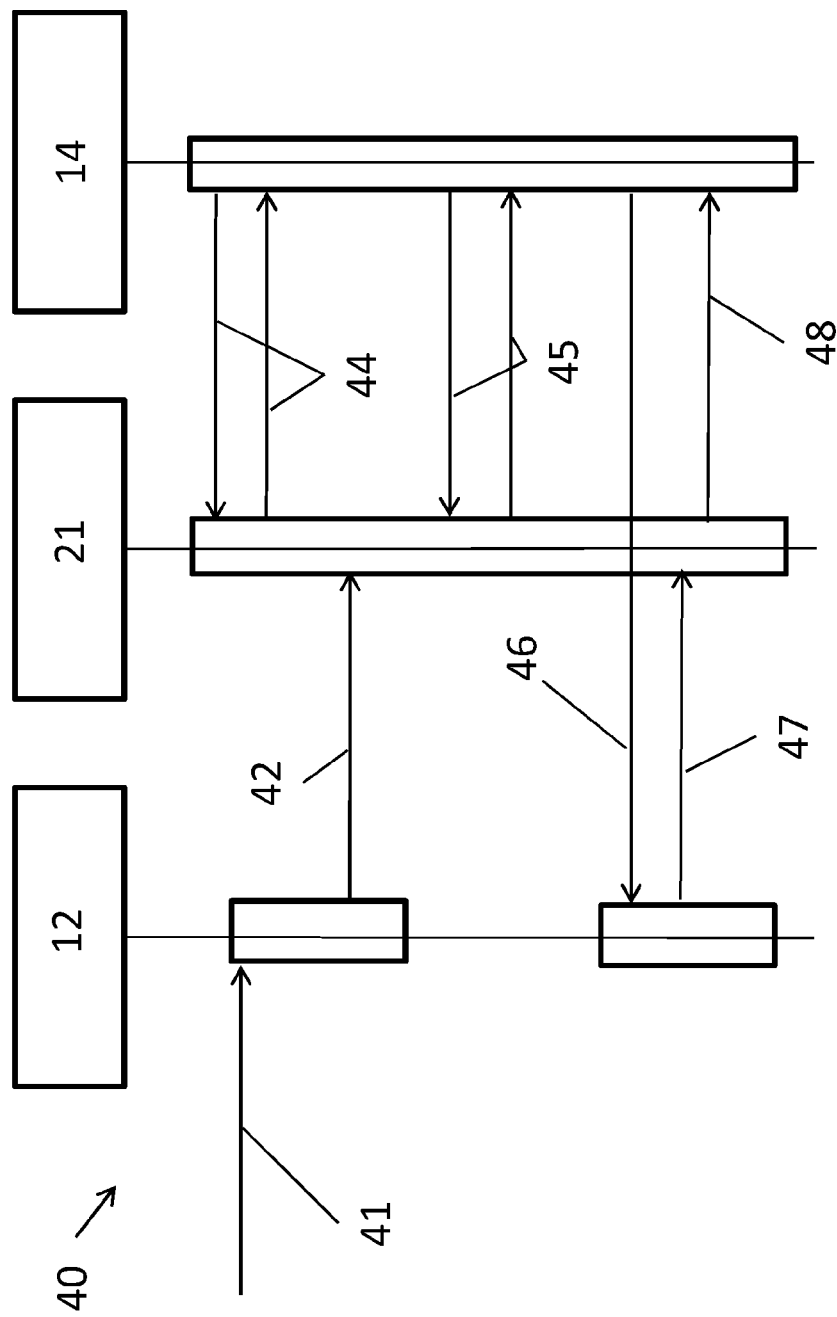
FIG. 4 is a sequence diagram illustrating "pull" notifications.

FIG. 4 shows a sequence diagram showing an alternative operation 40 in which, instead of aggregate message 26 being sent to user devices 14 at a prompt internal to electronic central server 21 or institutions 12, aggregate messages are pulled from electronic central server 21 by the user from one of the user devices 14. Institutions 12 perform delivery 42, upon receipt 41, of transaction messages to electronic central server 21 as described above. Electronic central server 21 also aggregates the transaction histories from the transaction messages as described above. In this case, however, a user device from user devices 14 sends a message 44 to electronic central server 21 requesting a message containing a transaction history involving the user and occurring within institutions 12. Upon receiving the message 44 from the user, electronic central server 21 constructs aggregate message 26 and performs corresponding delivery 45 of aggregate message 26 to user devices 14. If there have been no new transactions since the last delivery 44, electronic central server 21 can send a message indicating that no transactions took place.

Alternatively, the user can send a message 46 via one of user devices 14 directly to one of institutions 12 requesting an updated transaction history. The institution, in this case, sends a message 47 to electronic central server 21 requesting that a transaction history with transactions involving the user at that institution be sent to user devices 14. Message 47 then serves as a prompt for electronic central server 21 to perform delivery 48 of aggregate message 26 to user devices 14.

The delivering of the aggregate messages 26 to user devices 14 in atomic form has the advantage that the user is much more likely to see all the transactions within accounts in the user's name. The fraudster, even having complete access to the user's email accounts, will be unable to selectively excise fraudulent activity from the user's notifications and escape attention. Still further, even if the fraudster has gained access to the user's computer 14(*a*) or laptop 14(*c*) via a bot or worm specifically designed to hide the atomic messages, user will continue to receive notifications on other devices, such as wireless phone device 14(*b*).

The adding of the security infrastructure described above is typically a service provided to a user from an institution with which the user does business. The institutions are billed a fee based on the number of individual transactions sent via the aggregate message to the insitution's users. In one configuration, processor 23 in electronic central server 21 counts a number of individual transactions to be reported to the user within the transaction history. Alternatively, the user can be billed for the security service provided by electronic central server 21 In such a scenario, the user can be billed in various ways, including but not limited to flat fees, registration per feed, etc.

Figure 5:
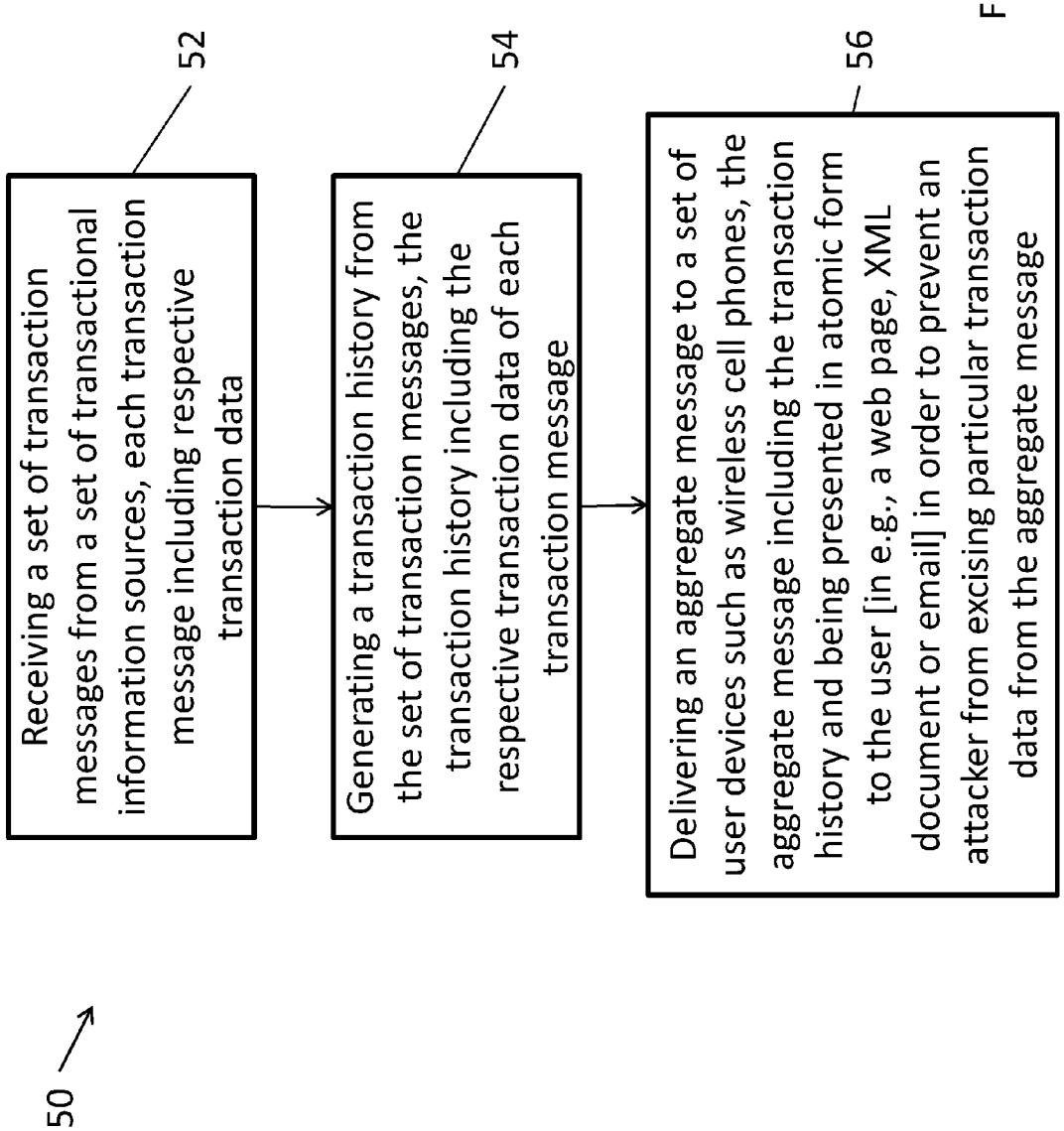
FIG. 5 is a block diagram illustrating a method of notification.

FIG. 5 illustrates a method 50 of providing transactional information to a user. In step 52, an electronic central server receives a set of transaction messages from a set of transactional information sources, each transaction message including respective transaction data. In step 54, the electronic central server generates a transaction history from the set of transaction messages, the transaction history including the respective transaction data of each transaction message. In step 56, the electronic central server delivers an aggregate message to a set of user devices, the aggregate message including the transaction history and being presented in atomic form to the user in order to prevent an attacker from excising particular transaction data from the aggregate message.

The transactional informational sources in step 52 are preferably financial institutions with which the user does business, but can be other types of sources, e.g., government institutions. The receiving of the transaction messages by the central electronic server is preferably done over secure communications channels.

The transaction history generated in step 54 is for a user. A way of accomplishing this generation is to store on a non-volatile memory the transaction messages, and then locate, with a processor, the messages corresponding to the user.

The aggregate message in step 56 is presented in atomic form so that no part of the transaction history may be excised from the aggregate message. The aggregate message further contains no sensitive information pertaining to the user.

While various embodiments of the invention have been particularly shown and described, it will be understood by those skilled in the art that various changes in form and details may be made therein without departing from the spirit and scope of the invention as defined by the appended claims.

For example, it should be understood that some embodiments are directed to an electronic environment which utilizes systems that providing transactional information to a user. Some embodiments are directed to electronic central server 21. Some embodiments are directed to a process of providing transactional information to a user. Also, some embodiments are directed to a computer program product which enables computer logic to perform the providing of transactional information to a user.

In some arrangements, electronic central server 21 is implemented by a set of processors or other types of control/processing circuitry running software. In such arrangements, the software instructions can be delivered to electronic central server 21 in the form of a computer program product (illustrated generally by a diskette icon 60 in FIG. 2) having a computer readable storage medium which stores the instructions in a non-volatile manner. Examples of suitable computer readable storage media include tangible articles of manufacture and apparatus such as CD-ROM, flash memory, disk memory, tape memory, and the like.

What is claimed is:

1. In an electronic central server, a method of providing transactional information to a user, the method comprising:
   receiving a set of transaction messages from a set of transactional information sources, each transaction message including respective transaction data;
   generating a transaction history from the set of transaction messages, the transaction history including the respective transaction data of each transaction message; and
   delivering an aggregate message to a set of user devices, the aggregate message including the transaction history and being presented in atomic form to the user in order to prevent an attacker from excising particular transaction data from the aggregate message;
   wherein delivering the aggregate message to the set of user devices further includes formatting the aggregate message into an XML document to be read by a syndicate feed reader on a user device from the set of user devices;
   wherein generating the transaction history from the set of transaction messages includes:
      extracting first transaction data from a first transaction message;
      extracting second transaction data from a second transaction message; and combining the first transaction data and the second transaction data to form at least a portion of the transaction history; and wherein delivering the aggregate message to the set of user devices further includes:
formatting the aggregate message to be inserted into an email message to be read by an email program on a user device from the set of user devices; and
inserting a digital certificate into the email message, the digital certificate causing delivery settings associated with the email message to the email program to take precedence over user-defined settings within the email program for a predetermined period of time.

2. A method as in claim 1, wherein delivering the aggregate message to the set of user devices includes:
sending a webpage to a browser running on a computerized device, the webpage including a list of financial transactions as the transaction history which includes the respective transaction data of each transaction message.

3. A method as in claim 2, wherein delivering the aggregate message to the set of user devices further includes:
broadcasting a wireless signal to a wireless phone device, the wireless signal including the list of financial transactions as the transaction history which includes the respective transaction data of each transaction message.

4. A method as in claim 1, wherein receiving the set of transaction messages from the set of transactional information sources includes acquiring the set of transaction messages through a set of secure communications channels; and
wherein delivering the aggregate message to the set of user devices includes transmitting the aggregate message to the set of user devices through communications media which is less secure than the set of secure communications channels.

5. A method as in claim 1, further including:
counting a number of individual transactions to be reported to the user within the transaction history; and
billing the institution a fee based on the number of individual transactions sent via the aggregate message to the set of user devices.

6. A method as in claim 5, further including:
billing the user a flat fee sent via the aggregate message to the set of user devices.

7. A method as in claim 1, further including:
storing the transaction history in a location within a computer readable storage medium accessible to the electronic central server, the location associated with the user; and
receiving a request from the user for the transaction history.

8. A method as in claim 1, wherein receiving the set of transactional messages includes acquiring the set of transactional messages in response to calls to an application programming interface, the application programming interface constructed and arranged to:
receive information concerning a transaction involving the user;
construct a message containing the information concerning the transaction; and
send the message to the user.

9. A method as in claim 1,
wherein the aggregate message is configured to prevent an attacker from excising particular transaction data from the aggregate message;
wherein delivering the aggregate message to the set of user devices includes:
sending the aggregate message to the set of user device over a set of insecure channels, the attacker being able to access a message to the user over a particular insecure channel of the set of insecure channel.

10. A method as in claim 1, further comprising:
receiving a request to access transaction data from the set of transactional information sources from a user device of the set of user devices;
wherein delivering the aggregate message to the set of user devices includes:
sending the aggregate message to the set of user devices in response to receiving the request.

11. A method as in claim 1, further comprising:
receiving a request to selectively excise transaction data from the aggregate message; and
denying the request.

12. A method as in claim 1, wherein the user-defined settings within the email program include a filter configured to cause email messages having specified text to not be delivered to the set of user devices; and
wherein inserting the digital certificate into the email message includes:
overriding the filter of the user-defined settings within the email program to cause the email message to be delivered to the set of user devices.

13. A method as in claim 12, wherein overriding the filter of the user-defined settings within the email program includes:
blocking, for the predetermined length of time, a delete command configured to delete the email before being delivered to the set of user devices.

14. An apparatus configured to provide transactional information to a user, the apparatus comprising:
a network interface;
a non-volatile memory; and
a processor coupled to the network interface and the non-volatile memory, the processor constructed and arranged to:
receive over the network interface a set of transaction messages from a set of transactional information sources, each transaction message including respective transaction data;
generate a transaction history from the set of transaction messages, the transaction history including the respective transaction data of each transaction message; and
deliver, over the network interface, an aggregate message to a set of user devices, the aggregate message including the transaction history and being presented in atomic form to the user in order to prevent an attacker from excising particular transaction data from the aggregate message;
wherein delivering the aggregate message to the set of user devices further includes formatting the aggregate message into an XML document to be read by a syndicate feed reader on a user device from the set of user devices;
wherein the network interface is further coupled to a communications media which is less secure than the set of secure communications channels; and
wherein delivering the aggregate message to the set of user devices further includes:
formatting the aggregate message to be inserted into an email message to be read by an email program on a user device from the set of user devices; and
inserting a digital certificate into the email message, the digital certificate causing delivery settings associated with the email message to the email program to take precedence over user-defined settings within the email program for a predetermined period of time.

15. An apparatus as in claim 14, wherein the communications media includes a broadcast device configured to broadcast a wireless signal to a wireless phone device, the wireless signal including the list of financial transactions as the transaction history which includes the respective transaction data of each transaction message.

16. An apparatus as in claim 14, wherein the non-volatile memory is constructed and arranged to store the transaction history in a location associated with the user;
  wherein the network interface is further configured to receive requests from the user for the transaction history.

17. A computer program product having a non-transitory computer readable storage medium which stores code to provide transactional information to a user, the code including instructions, upon receiving a set of transaction messages over a network interface from a set of transactional information sources, each transaction message including respective transaction data, the computer readable storage medium accessible to an electronic central server, to:
  generate a transaction history from the set of transaction messages, the transaction history including the respective transaction data of each transaction message; and
  deliver, over the network interface, an aggregate message to a set of user devices, the aggregate message including the transaction history and being presented in atomic form in order to the user in order to prevent an attacker from excising particular transaction data from the aggregate message;
  wherein delivering the aggregate message to the set of user devices further includes formatting the aggregate message into an XML document to be read by a syndicate feed reader on a user device from the set of user devices;
  wherein delivering the aggregate message to the set of user devices further includes:
    formatting the aggregate message to be inserted into an email message to be read by an email program on a user device from the set of user devices; and
    inserting a digital certificate into the email message, the digital certificate causing delivery settings associated with the email message to the email program to take precedence over user-defined settings within the email program.

18. A computer program product as in claim 17, wherein receiving the set of transaction messages from the set of transactional information sources includes acquiring the set of transaction messages through a set of secure communications channels; and
  wherein delivering the aggregate message to the set of user devices includes transmitting the aggregate message to the set of user devices through communications media which is less secure than the set of secure communications channels.

\* \* \* \* \*